(12) United States Patent
Alabsi et al.

(10) Patent No.: US 11,423,377 B1
(45) Date of Patent: Aug. 23, 2022

(54) LENDABLE COMPUTING RESOURCES

(71) Applicant: Amazon Technologies, Inc., Reno, NV (US)

(72) Inventors: Mohammed Samir Alabsi, Mercer Island, WA (US); David John Ward, Jr., Seattle, WA (US); Kiran Kumar Meduri, Bellevue, WA (US); Karthigeyan Seetharaman, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 725 days.

(21) Appl. No.: 14/010,213

(22) Filed: Aug. 26, 2013

(51) Int. Cl.
*G06Q 20/14* (2012.01)

(52) U.S. Cl.
CPC .................. *G06Q 20/145* (2013.01)

(58) Field of Classification Search
None
See application file for complete search history.

(56) References Cited

U.S. PATENT DOCUMENTS

| | | | | |
|---|---|---|---|---|
| 5,717,955 A * | 2/1998 | Swinehart | ............... | G06F 21/35 710/62 |
| 8,813,225 B1 * | 8/2014 | Fuller | ..................... | H04L 63/10 726/23 |
| 8,978,122 B1 * | 3/2015 | Zolfonoon | .......... | H04L 63/0815 726/4 |
| 9,275,408 B1 * | 3/2016 | King | ....................... | G06F 21/33 |
| 9,367,354 B1 * | 6/2016 | Ramsden-Pogue | ....... | G06F 9/50 |
| 9,679,279 B1 * | 6/2017 | Smith | ..................... | G06Q 30/06 |
| 2002/0002673 A1 * | 1/2002 | Narin | ..................... | G06F 21/53 713/152 |
| 2004/0246950 A1 * | 12/2004 | Parker | ............... | H04L 29/12018 370/356 |
| 2008/0155100 A1 * | 6/2008 | Ahmed | ................. | G06F 9/5011 709/226 |
| 2009/0276771 A1 * | 11/2009 | Nickolov | .............. | G06F 9/4856 717/177 |
| 2009/0292654 A1 * | 11/2009 | Katiyar | .................. | G06Q 50/06 705/412 |
| 2010/0036698 A1 * | 2/2010 | Garrison | ................ | G06Q 10/06 705/16 |
| 2010/0241751 A1 * | 9/2010 | Sonoda | ..................... | G06F 9/50 709/226 |

(Continued)

OTHER PUBLICATIONS

Orenstein, Computer World, "Application Programing Interface", Published Jan. 10, 2000, https://www.computerworld.com/article/2593623/app-development/application-programming-interface.html, retreived Jan. 15, 2018.*

(Continued)

*Primary Examiner* — Jamie R Kucab
(74) *Attorney, Agent, or Firm* — BakerHostetler

(57) ABSTRACT

In a multi-tenant web services platform, a request is received from a first customer requesting that a second customer be allowed to use a computing resource associated with the first customer. Control of the computing resource is transferred to the second customer based on a constraint selected by the first customer. A first portion of a cost associated with the computing resource is billed to the first customer. The control of the computing resource by the second customer is terminated in accordance with the constraint selected by the first customer.

20 Claims, 10 Drawing Sheets

(56) References Cited

U.S. PATENT DOCUMENTS

| | | | | |
|---|---|---|---|---|
| 2010/0287280 A1* | 11/2010 | Sivan | G06F 9/5072 | 709/226 |
| 2011/0307889 A1* | 12/2011 | Moriki | G06F 11/3495 | 718/1 |
| 2012/0005597 A1* | 1/2012 | Eberlein | G06F 9/4881 | 715/751 |
| 2012/0089736 A1* | 4/2012 | Kim | G06F 9/5061 | 709/226 |
| 2012/0124183 A1* | 5/2012 | Long | G06F 3/0659 | 709/219 |
| 2012/0215492 A1* | 8/2012 | Masurkar | G06F 11/0709 | 702/185 |
| 2013/0047266 A1* | 2/2013 | Radhakrishnan | G06F 21/40 | 726/28 |
| 2013/0145006 A1* | 6/2013 | Tammam | G06F 9/5027 | 709/223 |
| 2013/0212004 A1* | 8/2013 | Itwaru | G06Q 20/20 | 705/39 |
| 2013/0247034 A1* | 9/2013 | Messerli | G06F 9/45533 | 718/1 |
| 2013/0291068 A1* | 10/2013 | Huang | G06F 9/5072 | 726/4 |
| 2014/0052558 A1* | 2/2014 | Rogel | G06Q 30/0601 | 705/26.1 |
| 2017/0278087 A1* | 9/2017 | Beda, III | H04L 43/0817 | |

OTHER PUBLICATIONS

Hawkins, InformIT, "Total Cost of Ownership: The Driver for IT Infrastructure Management", Published Jun. 22, 2001, http://www.informit.com/articles/article.aspx?p=21841, retreived Jan. 16, 2018.*

Hawkins—InformIT—Total Cost of Ownership, The Driver for IT Infrastructure Management (Year: 2001).*

Buyya (p. 3, Non-Patent Literature) (Year: 2013).*

* cited by examiner

Instance Lease Page

| ZONE | START DATE | START TIME | STOP DATE | STOP TIME | COUNT | TYPE | LESSEE | STARTUP % | ON-GOING % |
|---|---|---|---|---|---|---|---|---|---|
| ☐ EAST | | | | | 10 | A | | | |
| ☐ EAST | | | | | 5 | A | | | |
| ☐ WEST | | | | | 5 | A | | | |
| ☑ WEST | 9/9/2008 | 6 AM | 9/9/2009 | 12 AM | 2 | B | Charity A | 50% | 0 |

2 INSTANCES SELECTED

[ Lend ]

FIG. 8

LENDABLE COMPUTING RESOURCES

BACKGROUND

A data center is a facility that houses computer systems and various networking, storage and other related components. Data centers may, for example, provide computing services to businesses and individuals as a remote computing service or to provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner.

Some virtualization technologies are capable of providing virtual resources that span two or more physical resources, such as a single virtual machine with multiple virtual processors that span multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage and/or other network-accessible resources may allow customers to reserve or purchase access to resources in various resource acquisition modes. The computing resource provider may provide facilities for customers to select and launch the desired computing resources, deploy application components to the computing resources and maintain an application executing in the environment. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors and with various installed software applications, runtimes and the like.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure:

FIG. 8 is a diagram illustrating an example user interface in accordance with the present disclosure;

DETAILED DESCRIPTION

Figure 1:
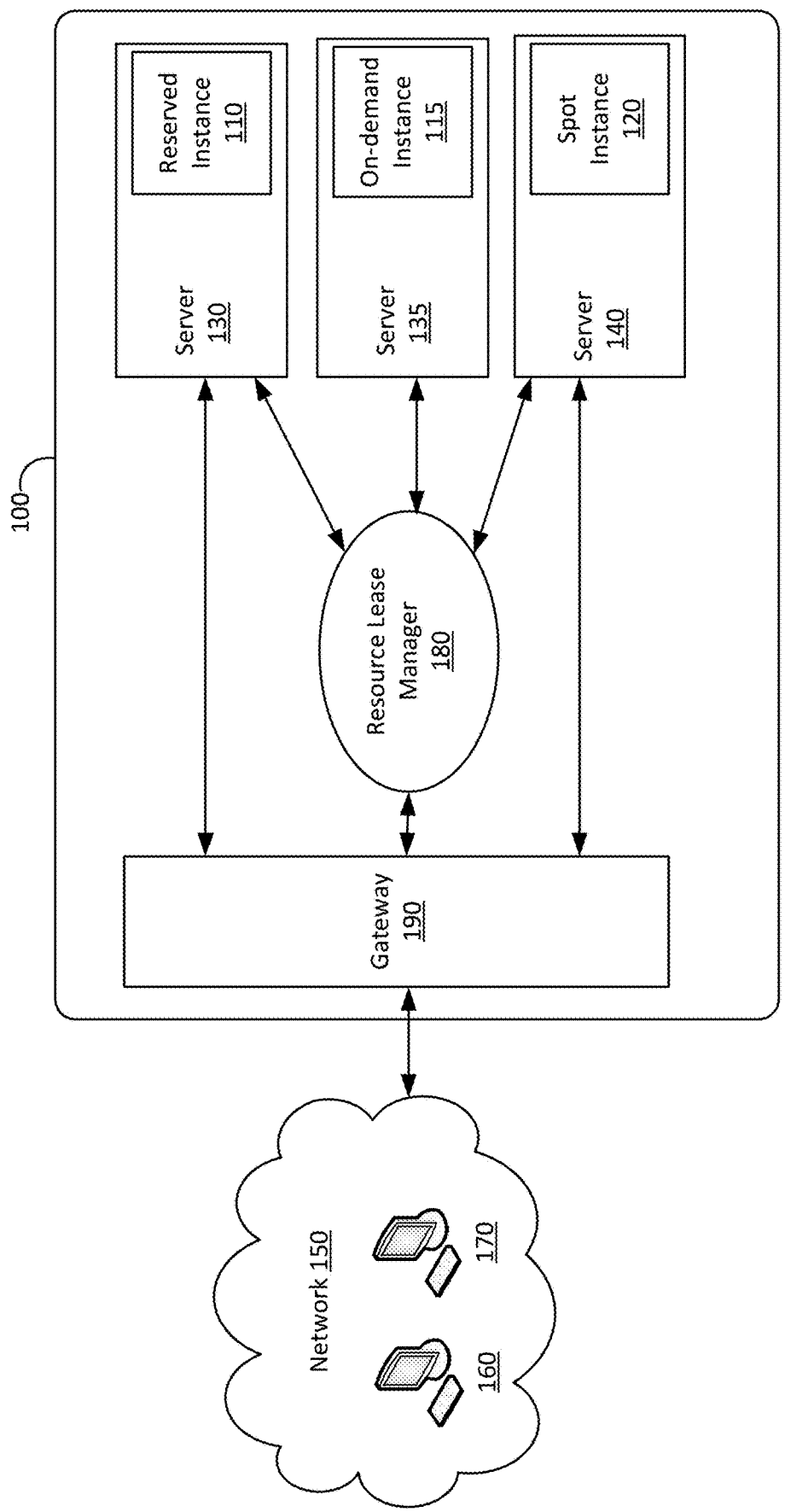
FIG. 1 is a diagram illustrating a mechanism for lending computing resources status in accordance with the present disclosure.

A service provider, such as an entity that operates a provider network, may offer computing resources, such as computing instances and storage resources, to customers (customers may also be referred to as entities or users). A customer may be any person or entity who accesses computing resources of a service provider and has a predefined relationship with the service provider. The service provider may, for example, provide a web services platform. Multiple customers may access a web services platform via a computing node and issue instructions to the web services platform. A web services platform may be called a multi-tenant web services platform to denote that multiple customers may access the platform. In turn, the web services platform may respond to these instructions by performing computing operations on one or more of a plurality of computing nodes that make up the web services platform. Other types of resources may be offered by the provider network.

When a customer obtains computing resources from a service provider, such as a multi-tenant web services platform, the computing resources are provided to the customer using a fixed control model. In other words, the computing resource is allocated to the customer according to a service agreement, and the customer is provided control of the computing resource at all times that the agreement is in place. However, there is generally no way to transfer control of the computing resource to another entity within the structure of a typical service agreement with a service provider.

In various embodiments described further in this disclosure, customers may be provided with the ability to transfer control of an allocated computing resource to another entity. Such flexibly controlled resources can be useful, for example, when re-allocation of computing resources between accounts belonging to the same organization can be used to handle an unexpected surge in traffic or demand for services that the organization owns. During large outage events, re-allocating computing resources such as computing instances can be helpful for avoiding impacts to critical services and allowing for increased availability. As another example, many charity organizations need or use computing resources, such as computing instances, and such organizations may benefit from donations of computing resources from service provider customers. The service provider can thus provide a lendable computing resource by implementing a new lease type that in some embodiments can be referred to as a "loan" or "lease." The donor can define the period of the "loan" as well as whether their donation will cover usage and/or the launch or other up-front costs. In one embodiment, a customer may be associated with a computing resource as the owner of the computing resource. The owner owns the original lease for the computing resource and is billed for its usage. The computing resource may be loaned or leased to another entity who can be referred to as the controller, user or recipient of the computing resource. The controller/user/recipient is allowed to have sole or limited (as the case may be) access to the computing resource and control how the computing resource is used. Further details will now be described.

FIG. 1 is a diagram illustrating a system 100 including a framework for providing resource lease services in accordance with the present disclosure. In FIG. 1, system 100 may include a reserved virtual machine instance 110, an on-demand virtual machine instance 115 and a spot virtual machine instance 120 that may execute, for example, on one or more server computers 130, 135 and 140, respectively. It will be appreciated that some embodiments may involve additional virtual machine instances of various types that may be instantiated on additional server computers.

FIG. 1 also illustrates a public network 150 that may include one or more computers, such as computers 160 and 170. According to one embodiment, instances 110, 115 and 120 may be configured to provide computing services to a computer user (not shown) of public network 150 via gateway 190 and computers 160 and 170. For example, reserved virtual machine instance 110 may provide a set of remote access enterprise applications to a group of users who may, for example, be employees of an enterprise customer.

A user at computer 160 or 170 may send a request to a resource lease manager 180 for leasing an instance to another user. In some embodiments, a request may be received directly from the user at computer 160 or 170. In response to receipt of the request, resource lease manager 180 may log the request and provide updates as to the status of the request. The resource lease manager 180 may communicate with other services to facilitate: (1) processing of the request, (2) collection of data pertaining to request, (3) transferring control of the resource to the other user in accordance with the request, and (4) generating interfaces to provide results of the request. The resource lease manager 180 may, for example, provide an interface for facilitating submission of the request. The resource lease manager 180 may further provide an interface for viewing the results of the request and modifying or cancelling the request.

Various aspects of the disclosure are now described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment and the like, that may be used to implement and distribute the infrastructure and services offered by the provider network. The resources may in some embodiments be offered to clients in units called "instances," such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages such as Ruby, Perl, Python, C, C++ and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 2:
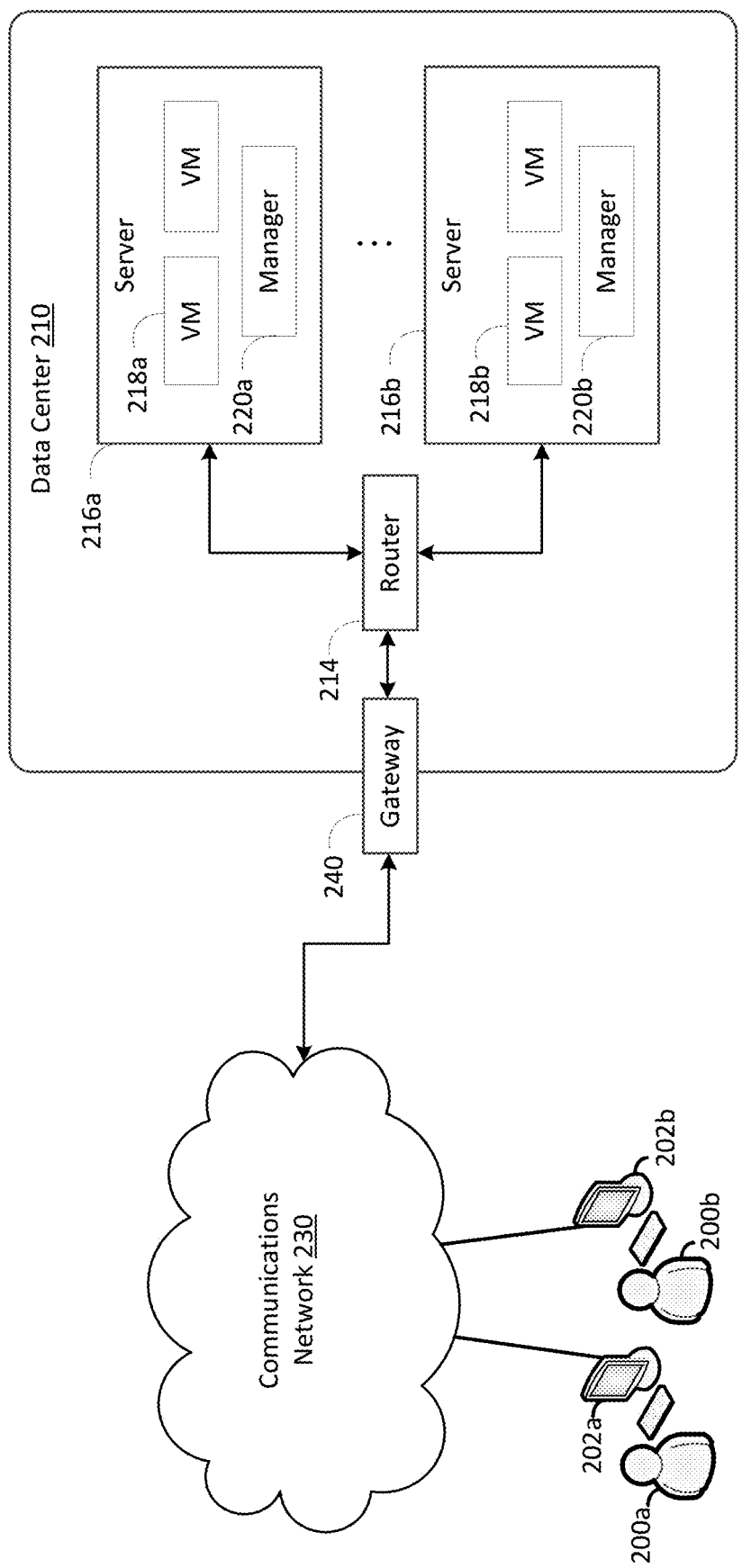
FIG. 2 is a diagram illustrating an example computing system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general purpose or may be available in a number of specific configurations. For example, data processing resources may be available as virtual machine instances. The instances may be configured to execute applications, including web servers, application servers, media servers, database servers and the like. Data storage resources may include file storage devices, block storage devices and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as web servers and/or one large processing resource as a database server, for example.

Data center 210 may include servers 216a and 216b (which may be referred herein singularly as "a server 216" or in the plural as "the servers 216") that provide computing resources available as virtual machine instances 218a and 218b (which may be referred herein singularly as "a virtual machine instance 218" or in the plural as "the virtual machine instances 218"). The virtual machine instances 218 may be configured to execute applications, including web servers, application servers, media servers, database servers and the like. Other resources that may be provided include data storage resources (not shown) and may include file storage devices, block storage devices and the like.

The availability of virtualization technologies for computing hardware has provided benefits for providing large scale computing resources for customers and allowing computing resources to be efficiently and securely shared between multiple customers. For example, virtualization technologies, such as those provided by VMware or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communications network 230 may provide access to computers 202. Computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

Computers 202 may also be utilized to configure aspects of the computing resources provided by data center 210. In this regard, data center 210 might provide a web interface through which aspects of its operation may be configured through the use of a web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216a and 216b (which may be referred herein singularly as "a server 216" or in the plural as "the servers 216") shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances. The instance managers 220 may be a virtual machine monitor (VMM) or another type of program configured to enable the execution of virtual machine instances 218 on servers 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details.

Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared and other types of information. The deployment component utilizes the customer-provided configuration and cache warming logic to launch, configure and prime new instances of computing resources.

Figure 3:
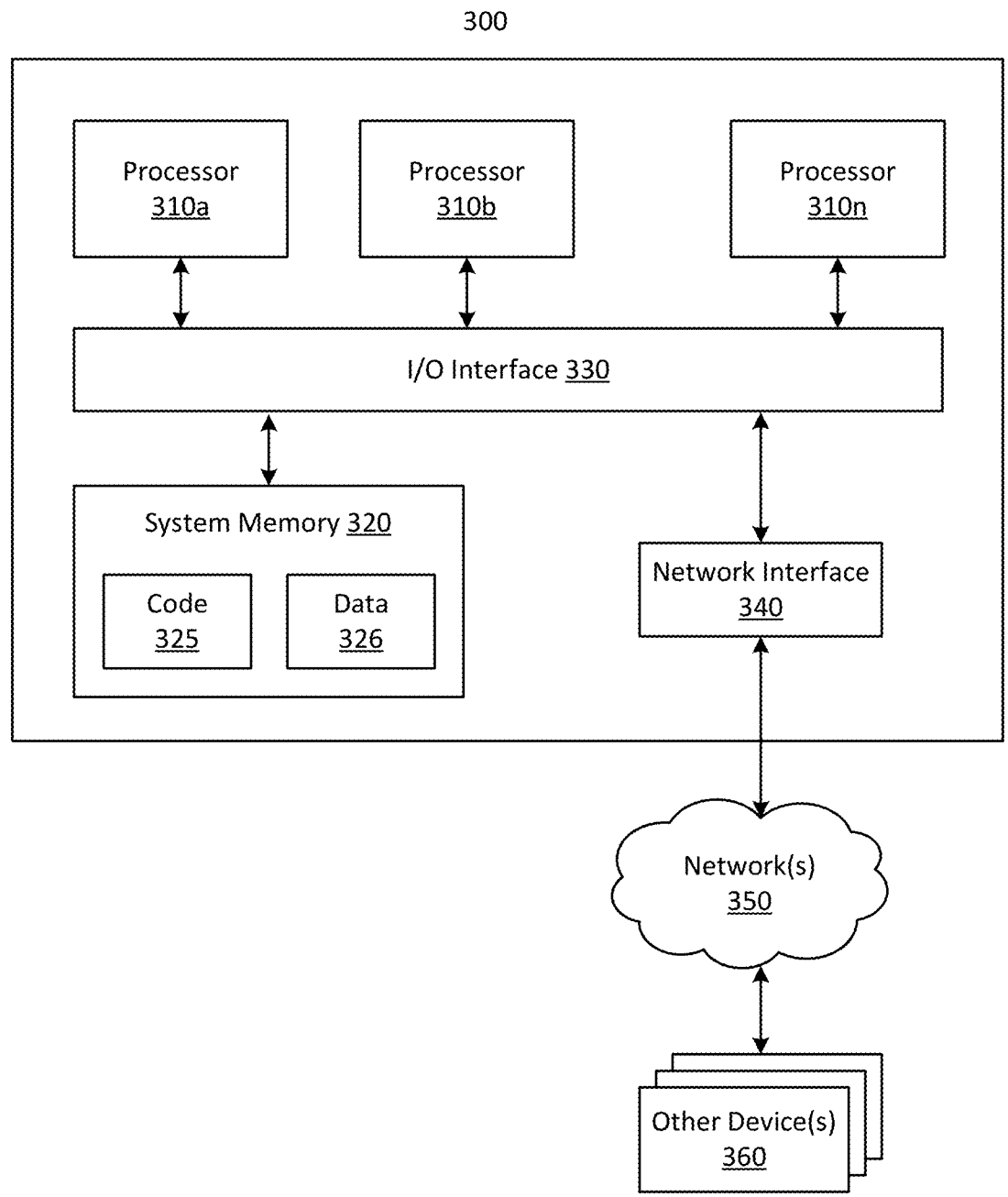
FIG. 3 is a diagram illustrating an example computing system that may be used in some embodiments.

In at least some embodiments, a server that implements a portion or all of one or more of the technologies described herein, including the techniques to implement the functionality of a resource lease manager 180 may include a general purpose computer system that includes or is configured to access one or more computer-accessible media. FIG. 3 illustrates such a general purpose computing device 300. In the illustrated embodiment, computing device 300 includes one or more processors 310a, 310b and/or 310n (which may be referred herein singularly as "a processor 310" or in the plural as "the processors 310") coupled to a system memory 320 via an input/output (I/O) interface 330. Computing device 300 further includes a network interface 340 coupled to I/O interface 330.

In various embodiments, computing device 300 may be a uniprocessor system including one processor 310 or a multiprocessor system including several processors 310 (e.g., two, four, eight or another suitable number). Processors 310 may be any suitable processors capable of executing instructions. For example, in various embodiments, processors 310 may be general purpose or embedded processors implementing any of a variety of instruction set architectures (ISAs), such as the x86, PowerPC, SPARC, or MIPS ISAs or any other suitable ISA. In multiprocessor systems, each of processors 310 may commonly, but not necessarily, implement the same ISA.

System memory 320 may be configured to store instructions and data accessible by processor(s) 310. In various embodiments, system memory 320 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 320 as code 325 and data 326.

In one embodiment, I/O interface 330 may be configured to coordinate I/O traffic between processor 310, system memory 320 and any peripheral devices in the device, including network interface 340 or other peripheral interfaces. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computing device 300 and other device or devices 360 attached to a network or network(s) 350, such as other computer systems or devices as illustrated in FIGS. 1 through 3, for example. In various embodiments, network interface 340 may support communication via any suitable wired or wireless general data networks, such as types of Ethernet networks, for example. Additionally, network interface 340 may support communication via telecommunications/telephony networks, such as analog voice networks or digital fiber communications networks, via storage area networks such as Fibre Channel SANs or via any other suitable type of network and/or protocol.

In some embodiments, system memory 320 may be one embodiment of a computer-accessible medium configured to store program instructions and data as described above for FIGS. 1 and 2 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 300 via I/O interface 330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 300 as system memory 320 or another type of memory. Further, a computer-accessible medium may include transmission media or signals—such as electrical, electromagnetic or digital signals—conveyed via a communication medium, such as a network and/or a wireless link, such as may be implemented via network interface 340. Portions or all of multiple computing devices, such as those illustrated in FIG. 3, may be used to implement the described functionality in various embodiments; for example, software components running on a variety of different devices and servers may collaborate to provide the functionality. In some embodiments, portions of the described functionality may be implemented using storage devices, network devices or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages such as Ruby, Perl, Python, C, C++ and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors and with various installed software applications, runtimes and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g., size, platform, tenancy, availability zone and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type and/or configuration of computing resource in a specific availability zone for a longer period than desired. If the technical architecture or needs of the application change, the customer may not be able to realize a return on their investment in the reserved instances.

Operators of such provider networks may in some instances implement a flexible set of resource reservation, control and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models and so on.

The provider network may support several different purchasing modes (which may also be referred to herein as reservation modes) corresponding to some of the instance types described above. For example, the provider network may support long-term reservations, on-demand resource allocations or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 4:
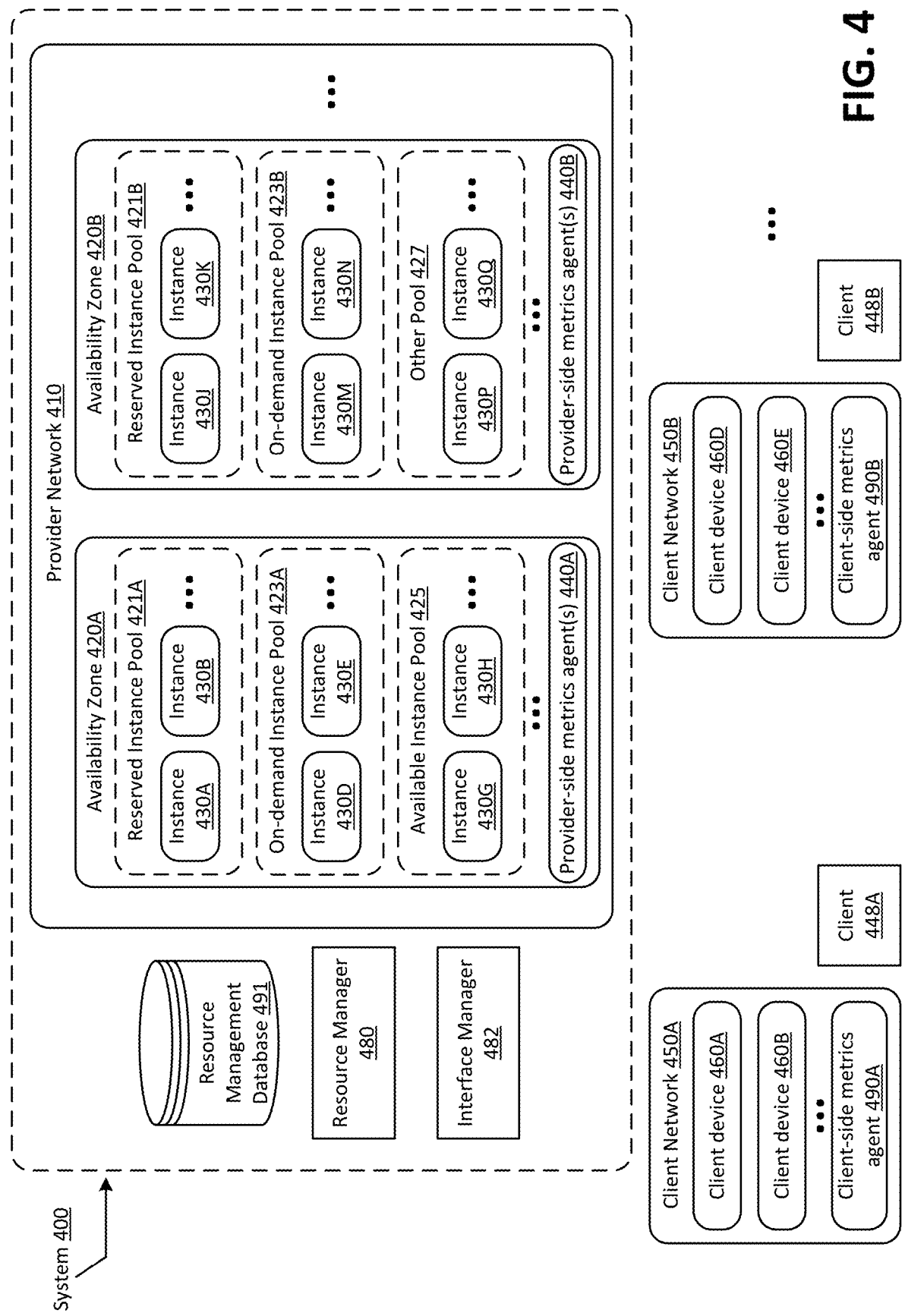
FIG. 4 is a diagram illustrating a system for providing computing resources in accordance with the present disclosure.

FIG. 4 illustrates an example system environment for providing instances, according to at least some embodiments. The system 400 may include a provider network 410 comprising a plurality of resource instances 430 (which may be referred herein singularly as "a resource instance 430" or in the plural as "the resource instances 430"), such as instances 430A, 430B, 430D, 430E, 430G and 430H in one availability zone 420A and instances 430J, 430K, 430M, 430N, 430P and 430Q in a different availability zone 420B. The various resource instances 430 in the availability zones 420A and 420B (which may be referred herein singularly as "an availability zone 420" or in the plural as "the availability zones 420") may be reserved and/or allocated for use by clients (or potential clients), such as client 448A and 448B (which may be referred herein singularly as "a client 448" or in the plural as "the clients 448"). In the illustrated embodiment, system 400 includes a resource manager 480 and an interface manager 482. As noted earlier, in some embodiments the functionality of the interface manager 482 may be implemented by a subcomponent of the resource manager 480.

The interface manager 482 may in some embodiments implement one or more programmatic interfaces allowing clients 448 to search for, browse, reserve and acquire instances 430 to obtain various types of services, e.g., to run and/or access various applications. In the illustrated embodiment, at a given point in time, some or all of the instances 430 may be assigned to instance pools, such as reserved instance pools 421A or 421B, on-demand instance pools 423A or 423B, available instance pool 425 or other pools such as other pool 427.

In some embodiments a given pool, such as available instance pool 425, may itself contain its own sub-pools, e.g., based on the modes of instance reservation and allocation supported. Each pool (or sub-pool) may have an associated pricing policy for its instances, as well as other properties, such as interruptibility settings, for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 430 illustrated in FIG. 4 are shown as belonging to availability zones 420, in other embodiments the provider network 410 may be organized differently, e.g., in some embodiments availability zones 420 may not be implemented. Availability zones 420 may be grouped into geographic regions (not shown in FIG. 4) in some embodiments. Instance pools may be implemented within availability zones in some implementations (e.g., each availability zone may have its own reserved instance pool); while in other implementations an instance pool or sub-pool may span multiple availability zones.

Figure 5:
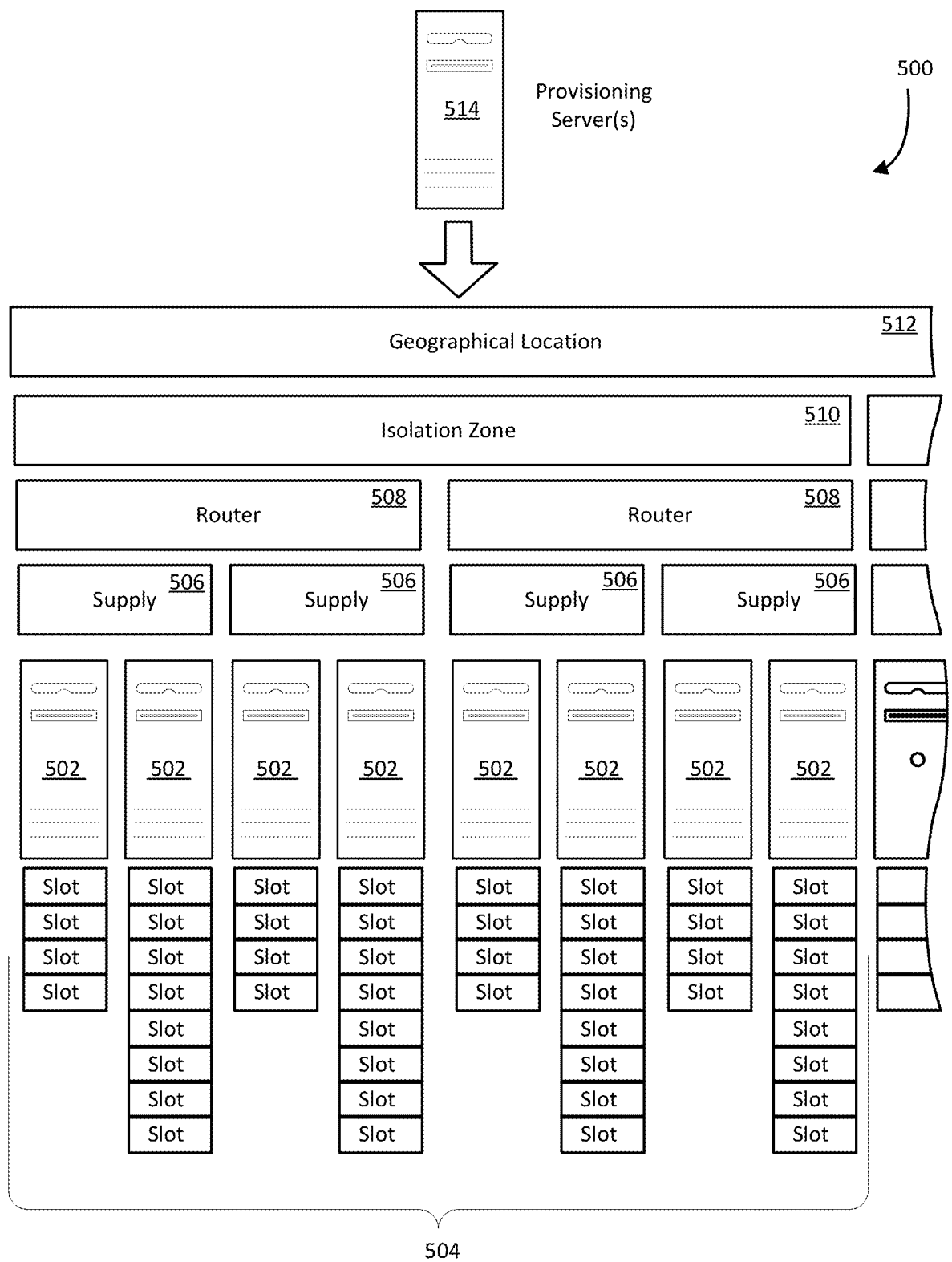
FIG. 5 is a diagram illustrating a mechanism for providing computing resources in accordance with the present disclosure.

In some embodiments, such as in FIG. 5, a data center 500 may be viewed as a collection of shared computing resources and/or shared infrastructure. For example, as shown in FIG. 5, a data center 500 may include virtual machine slots 504, physical hosts 502, power supplies 506, routers 508, isolation zones 510 and geographical locations 512. A virtual machine slot 504 may be referred to as a slot or as a resource slot. A physical host 502 may be shared by multiple virtual machine slots 504, each slot 504 being capable of hosting a virtual machine, such as a guest domain. Multiple physical hosts 502 may share a power supply 506, such as a power supply 506 provided on a server rack. A router 508 may service multiple physical hosts 502 across several power supplies 506 to route network traffic. An isolation zone 510 may service many routers 508, the isolation zone 510 being a group of computing resources that may be serviced by redundant resources such as a backup generator. Multiple isolation zones 510 may reside at a geographical location 512, such as a data center 500. A provisioning server 514 may include a memory and processor configured with instructions to analyze user data and rank available implementation resources using determined roles and shared resources/infrastructure in the calculation. The provisioning server 514 may also manage workflows for provisioning and deprovisioning computing resources as well as detecting health and/or failure of computing resources.

A provisioning server 514 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 502 that shares a router 508 with a second system may be more proximate to the second system than to a third system only sharing an isolation zone 510. Depending on an application, it may be desirable to keep the distance low to increase throughput or high to increase durability. In another embodiment, the distance may be defined in terms of unshared resources. For example, two slots 504 sharing a router 508 may have a distance of a physical host 502, and a power supply 506. Each difference in resources may be weighted differently in a distance calculation.

A placement calculation may also be used when selecting a prepared resource to transfer to a client account. In one embodiment, a client requests a virtual machine having an operating system. The provisioning server 514 may determine that the request may be satisfied with a staged volume in a slot 504. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 514 may determine that a placement near other existing volumes is desirable for latency concerns. Therefore, the decision may find that sharing a router 508 is desirable but sharing a supply 506 and physical host 502 is undesirable. A volume in the pool may then be selected that matches these attributes and placed preferably on a same router 508 as the other volumes but not the same physical host 502 or power supply 506. In other examples of placement decisions, such as those relating to a database shard, sharing of infrastructure may be less desirable and a volume may be selected that has less infrastructure in common with other related volumes.

Operators of provider networks, such as those described above, may, in some embodiments, provide an infrastructure such as resource lease manager 180 depicted in FIG. 1 configured to provide customers with the ability to request a lease or loan of a computing resource, such as a computing instance. In many cases, such resources can only be transferred via a complete transfer of ownership of the resource. For example, the service provider may allow for changes in ownership, which may be enabled through a means for trading or selling of resources via an electronic marketplace or other means for exchange.

In various embodiments, leased computing resources may include instances of various types such as reserved instances and spot instances as discussed above. The leased computing resources may also include other computing resources provided by the service provider, such as storage services. The resource lease manager 180 may be made accessible via an API, a software development kit (SDK), a graphical user interface or a user interface that may be accessed via a web browser or other input mechanisms.

In some embodiments, the resource lease manager 180 may allow an owner of a computing resource (who may be referred to as a "donor" or "lessor") to define the period of the loan or lease as well as whether their donation will cover usage and/or the launch or other up-front costs. The resource lease manager 180 can thus enable a lendable computing resource by implementing a new lease type that in some embodiments can be referred to as a "loan" or "lease." In one embodiment, a customer may be associated with a computing resource as the owner of the computing resource. The owner of a resource typically owns the original lease for the computing resource and is billed for its usage. In various embodiments, the computing resource may be loaned or leased to another entity who can be referred to as the recipient or lessee of the computing resource. The recipient or lessee is allowed to have sole or limited (as the case may be) access to the computing resource and control how the computing resource is used in accordance with the loan or lease.

Figure 9:
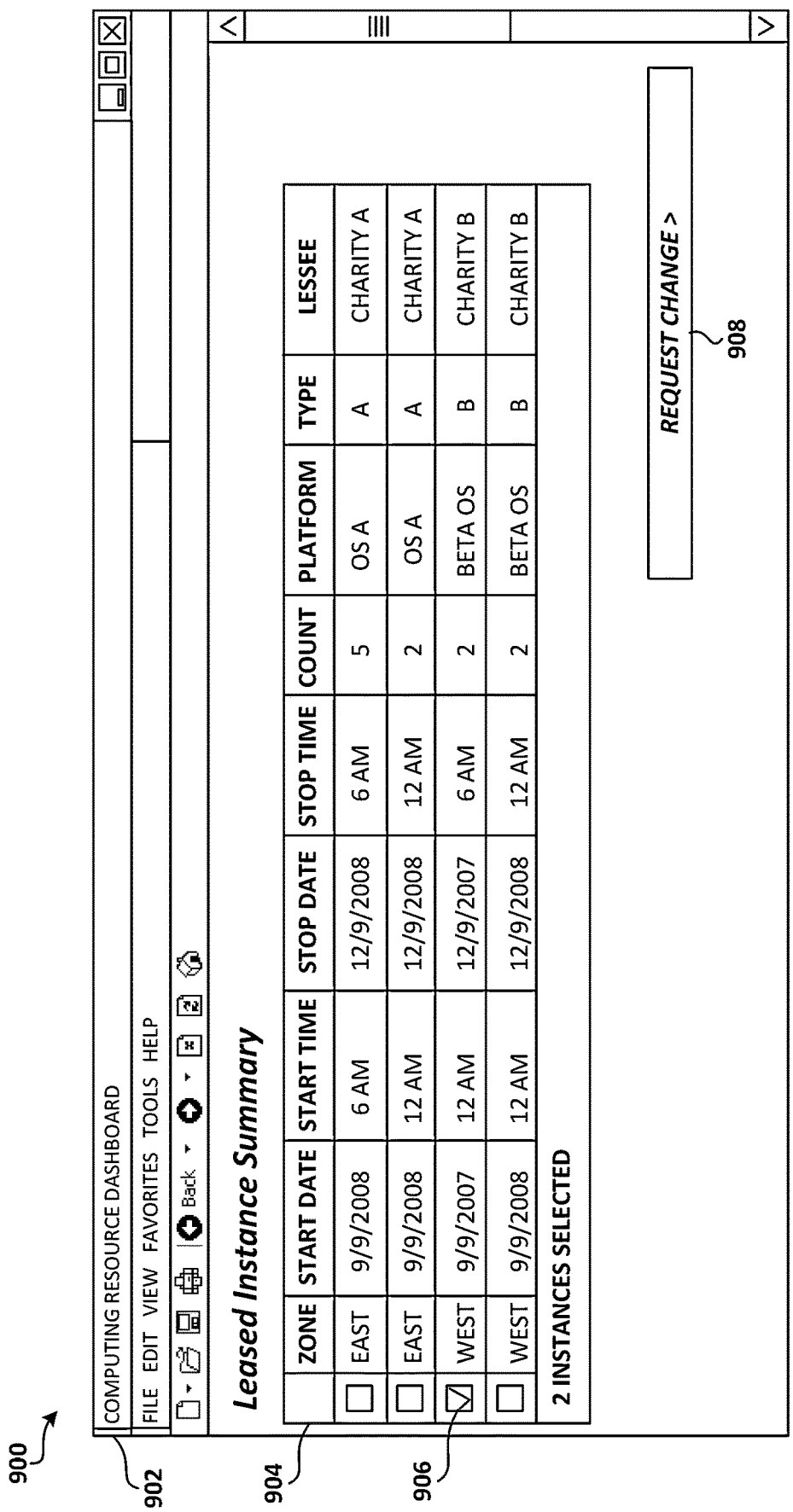
FIG. 9 is a diagram illustrating an example user interface in accordance with the present disclosure.

A user interface may be provided to allow access to the resource lease manager 180. For example, a resource lease manager management console as shown in FIG. 9 may be provided. Additionally or optionally, an option to loan or lease a computing resource may be provided when creating or launching a resource such as a computing instance.

A user interface may also be provided to allow a customer to view all of a customer's loaned or leased resources. The user interfaces described herein may be interactive and the customer may be able to select parameters such as a time range, paid costs and other constraints pertaining to the loan or lease.

In one embodiment, an owner of a resource may be allowed to donate resources for a predetermined period of time. The predetermined period of time may include a minimum time period that may be defined by the service provider, such as a minimum billable time increment. The predetermined period of time may also include a maximum length of time that the user can use the computing resource (i.e., the term of the lease). For example, the owner of the resource may loan the resource to another user for a minimum period of one hour and up to several months or years. The service provider may also allow the resource to be loaned indefinitely.

In some embodiments, the predetermined period of time can be modified after starting the loan or lease. For example, it may be determined that the user of the loaned resource requires continued use of the resource after the term of the lease is scheduled to expire. The owner of the resource may elect to extend the predetermined period of time. Alternatively, the predetermined period of time can be shortened or cancelled. For example, it may be determined that the recipient of the loaned resource no longer requires use of the resource. The owner may elect to terminate the loan in response.

When the term of the lease has expired, control of the computing resource may be returned to the owner and, in one embodiment, the user's data may be deleted when the computing resource is returned. Similarly, when the computing resource is transferred from the owner to the recipient, the owner's data may be deleted or otherwise made unavailable to the recipient. In cases where the computing resource is computing capacity, then the loan or lease may not involve the transfer of software and/or data, and security measures need not be taken. In some embodiments, however, the loaned computing resource can include applications or data if the software licenses permit, and the service provider may implement processes to ensure that software or data marked as private is not made accessible according to security policies.

Allocation of computing resources to customers is typically structured as a two-way contract—the service provider provides computing capacity to provide the requested computing resource, and the customer promises to meet the financial obligation for using the requested computing resource. A service provider may allocate computing resources, such as computing instances to an entity under a single account. The entity may further identify a number of users who are authorized to use the computing resource. For example, an organization may acquire a computing instance and allow a number of employees of the organization to access the computing instance. The organization (or a representative of the organization) is considered the "owner" of the computing instance and is responsible for payments to the service provider.

In the embodiments described herein, the owner organization may loan the computing resource to another entity such as another. The recipient organization, after receiving access to the loaned computing resource, may allow employees of the recipient organization to access the computing resource. The owner of the computing resource may continue to pay for the computing resource. In some embodiments, the loaned computing resource may include computing capacity for running a computing instance as described elsewhere in this disclosure.

The level of control that the recipient has over the loaned or transferred resource may vary and may be selectable by the owner or lessor. For example, the owner/lessor may loan computing capacity to run a reserved instance. The level of control that is available to the recipient may not allow the recipient to change the instance type or any aspect of the configuration of the reserved instance. This level of control may be referred to as a secondary level of control in some embodiments. Any level of control retained by the owner may be referred to as a primary level of control.

The extent to which the owner retains payment obligations may also vary and may be selectable by the owner. For example, the recipient can be required to pay on-going usage costs and the owner can pay up-front costs for the computing resource. As another example, the owner can pay a portion of the on-going costs while the recipient pays for the remaining portion, thus effectively providing the computing resource at a discounted rate. Alternatively, the owner can pay for all billing associated with the computing resource.

Potential recipients of such donated or loaned computing resources may be identified in a number of ways. In one embodiment, potential recipients can sign up on a web page associated with the service provider to receive donated computing resources. In another embodiment, potential recipients can include code on their own web site that allows users to initiate a process to donate computing resources.

Figure 6:
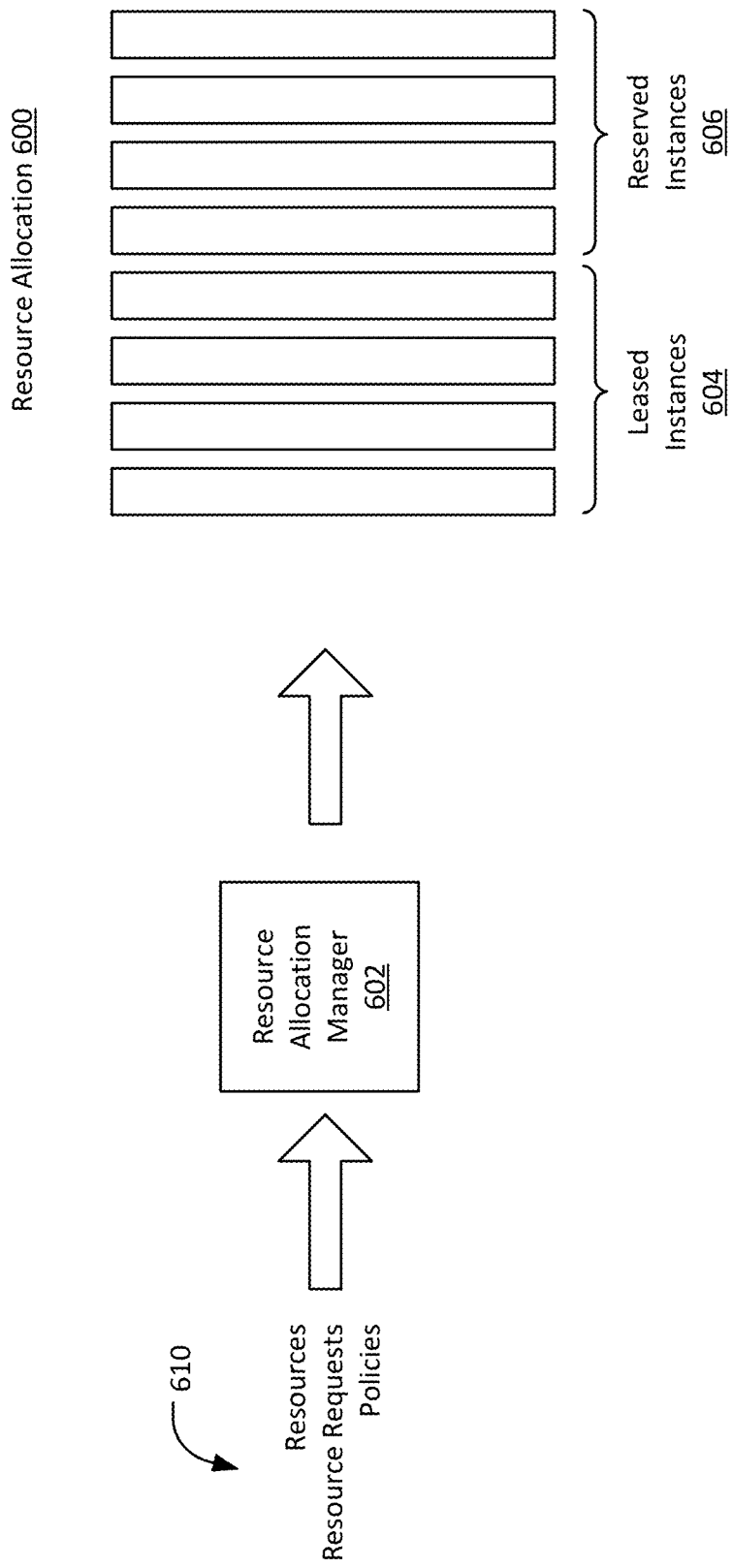
FIG. 6 is a diagram illustrating an example of providing computing resources in accordance with the present disclosure.

Referring to FIG. 6, illustrated is an example of providing computing resources in accordance with this disclosure. Referring to FIG. 6, a provider network may implement a resource allocation 600 that may represent planning for allocation of computing resource slots at a current or future time. A provider network may maintain a plurality of such resource allocations for different users. Resource allocation 600, in this example, may include allocations for leased instances 604 and allocations for reserved instances 606. The resource lease manager 180 in FIG. 1 implemented by a provider network may include a resource allocation manager 602. The resource allocation manager 602 may access data including a lease request provided by a customer. The resource allocation manager 602 may also access policies and other information 610 that may be provided by the customer or by the provider network. The policies may include information usable for determining whether the lease request can be provided by the provider network and the constraints for affecting the lease. The resource allocation manager 602 may access one or more policies that may define additional objectives and policies for fulfilling the lease request. The resource allocation manager 602 may also access constraints provided by the customer for fulfilling the request, such as the lease period and the type of billing that the customer is willing to pay. In one embodiment, the resource lease manager 180 can be embodied in software that can be installed on a network of computers in the provider network.

Figure 7:
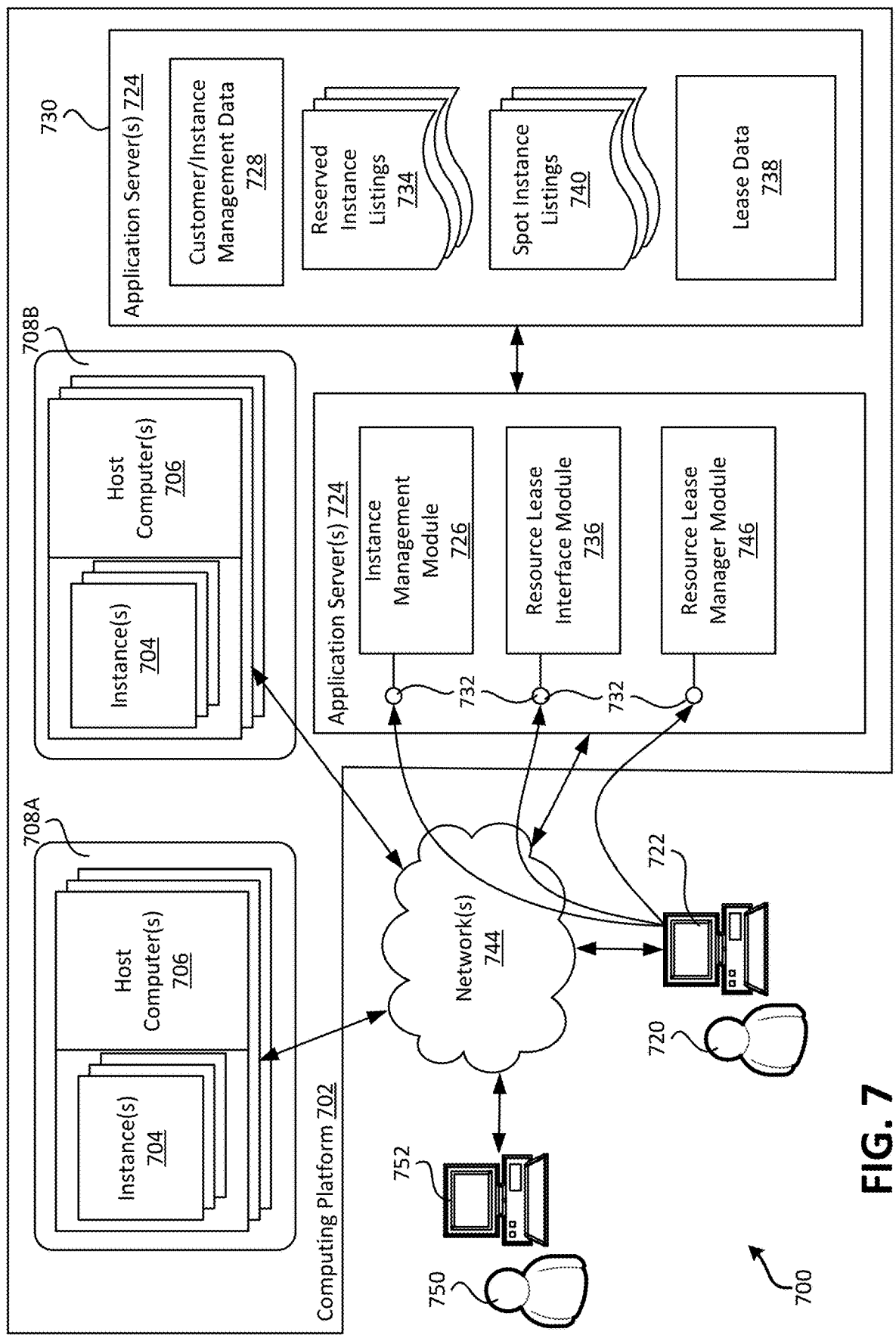
FIG. 7 is a diagram illustrating a system for providing computing resources in accordance with the present disclosure.

FIG. 7 is a system diagram that shows an illustrative operating environment 700 including several components for implementing a resource lease manager. The environment 700 may include a computing platform 702. The computing platform 702 may be implemented by a computing resource provider to make computing resources available to customers 720 for the deployment and execution of distributed applications.

The computing resources provided by the computing platform 702 may include various classes of resources, such as data processing resources, data storage resources, data communication resources and the like. Each class of computing resource may be general purpose or may be available in a number of specific configurations. For example, data processing resources provided by the computing resource provider may be made available in discrete units or instances 704. Each instance 704 may represent the data processing resources of a dedicated host computer 706, referred to herein as a dedicated tenancy instance, or each instance 704 may represent a virtual machine instance executing on a host computer 706, which may also be referred to as a shared tenancy instance.

The host computers 706 may represent generic multi-processor server devices, special purpose hardware devices and the like. As discussed above, various types and configurations of instances 704 may be made available. For example, each available instance 704 of data processing resources may be of a particular size—such as small, medium and large—representing different combinations of physical and/or virtual resources comprising or allocated to the instance, such as number and types of processors, amounts of memory, size and speed of local storage, number of networking addresses or communication channels and/or the like. An instance 704 may further be configured with a particular platform, such as a specific OS and/or hypervisor installed on the instance. Instances 704 may also be made available with specific application software components installed, such as web server software, database management software, portal software, a specific runtime environment or platform and the like.

Instances may further be available in specific availability zones 708A and 708B, as described above. As discussed above, an availability zone 708 may represent a particular physical location, such as a data center or other physical and/or logical grouping of underlying host computers 706 and computing devices supporting the instances 704 provided by the computing platform 702. Providing instances 704 in different sizes and in different availability zones 708 may allow a deployed application to be geographically dispersed, improving end-user performance and insulating the overall application from failures in one particular location or zone. For example, a customer 720 may choose to deploy a number of small instances 704 across multiple availability zones 708 for some functions of the application, such as web servers, while deploying a single large instance 704 for other functions, such as a database server, for example. The customer 720 may also require that instances 704 be hosted by host computers 706 in particular geographical locations for geopolitical reasons as well.

End-users 750 may utilize end-user computer systems 752 to access the functionality of the application executing on the allocated instances 704 through one or more networks 744. The network(s) 744 may represent a combination of local-area networks (LANs), wide-area networks (WANs), the Internet and/or any other networking infrastructure known in the art that connects the host computers 706 in the computing platform 702 to the end-user computer systems 752, to each other and to other computing resources. The end-user computer systems 752 may represent personal computers (PCs), desktop workstations, laptops, notebooks, personal digital assistants (PDAs), electronic-book readers, game consoles, set-top boxes, consumer electronics devices, server computers or any other computing device capable of connecting to the network(s) 744 and communicating with the host computers 706 in the computing platform 702.

A customer 720 wishing to access resources on the computing platform 702 may similarly utilize a customer computer system 722 to connect the computing platform over the network(s) 744 and to configure and manage the computing resources provided by the computing platform. In this regard, the computing platform 702 may include a number of application servers 724 that provide various management services to the customer 720 for purchasing and maintaining instances 704 of data processing and/or other computing resources, deploying components of the application across the purchased instances 704, monitoring and administering execution of the application and the like. As in the case of the end-user computer systems 752, the customer computer systems 722 may represent PCs, desktop workstations, laptops, notebooks, PDAs, electronic-book readers, game consoles, set-top boxes, consumer electronics devices, server computers or any other computing device capable of connecting to the network(s) 744 and communicating with the application servers 724 in the computing platform 702.

The application servers 724 may represent standard server computers, database servers, web servers, network appliances, desktop computers, other computing devices and any combination thereof. The application servers 724 may execute a number of modules in order to provide the management services. The modules may execute on a single application server 724 or in parallel across multiple application servers in the computing platform 702. In addition, each module may consist of a number of subcomponents executing on different application servers 724 or other computing devices in the computing platform 702. The modules may be implemented as software, hardware or any combination of the two.

The application servers 724 may execute an instance management module 726. The instance management module 726 may allow customers 720 to purchase and configure instances 704 of data processing or other computing resources, manage and maintain purchased instances 704 and the like. Instances 704 may include instances that may be obtained through various modes, such as reserved instances, spot instances and on demand instances as described above. Purchased instances 704 for each customer 720 and corresponding configuration and status information may be stored in customer/instance management data 728. The customer/instance management data 728 may be stored in a database 730 or other data storage system available to the application server(s) 724 in the computing platform 702.

As described above, reserved instances provide the customer with the ability to reserve a number of a specific type and configuration of instances for a term, such as one year or three years. The reserved instances may represent actual instances of data processing resources configured as specified and placed in stand-by for launch and deployment by the customer 720 at a future time, or the reserved instances 704 may represent overall capacity reserved by the computing resource provider for quick configuration and launch when required. When deploying an application, a customer 720 may purchase and launch a number of on-demand instances 704 of a specific type and configuration (e.g., size, platform, tenancy, availability zone and the like) to support immediate availability of the application, as well as a number of reserved instances of the same or similar type and configuration for scaling up the application in the future in response to increased demand or capacity requirements of the application, for example.

A customer 720 may utilize a web browser application executing on the customer computer system 722 to access a user interface presented by the instance management module 726 through a web service to perform the configuration and maintenance of customer 720's purchased instances 704. The customer 720 may also utilize a web browser application executing on the customer computer system 722 to access a user interface presented by the resource lease interface module 736 through a web service to request a loan or lease as discussed above. Additionally or alternatively, the instance management module 726 and resource lease interface module 736 may expose an application programming interface (API) 732, which may be accessed over the network(s) 744 by stand-alone application programs executing on the customer computer system 722. Other mechanisms for accessing the configuration and maintenance services of the instance management module 726 or resource lease manager module 746 may also be imagined, including remote procedure calls, SOAP-based web services, remote file access, proprietary client-server architectures and the like.

In some embodiments, the instance management module 726 may allow customers 720 to purchase both on-demand instances and reserved instances. On-demand instances may be purchased and launched immediately, allowing for quick deployment of the components of the application. On-demand instances may further be added or removed as needed, either manually or automatically through auto scaling, as demand for or capacity requirements of the application changes over time. The customer 720 may incur ongoing usage costs related to their on-demand instances, based on the number of hours of operation of the instances 704 and/or the actual resources utilized, for example.

A customer 720 may determine that in addition to their purchased instances 704, the customer 720 may want to lease or lend some of the purchased instances 704 to another customer. The resource lease manager module 746 may access the reserved instance listings 734, spot instance listings 740 and lease data 738 in the database 730. The reserved instance listings 734 may include listings for reserved instances.

The application servers 724 may execute resource lease interface module 736 and resource lease manager module 746. The resource lease manager module 746 may also allow customer 720 to view status of the customer's requests. The customer 720 may utilize a web browser application executing on the customer computer system 722 to access user interfaces (UI) presented by the resource lease interface module 736 through a web service to browse for pending requests and make changes. Additionally or alternatively, the resource lease interface module 736 may expose an API 732, which may be accessed over the network(s) 744 by standalone application programs executing on the customer computer system 722.

The resource lease manager module 746 may further store data records regarding submitted and fulfilled requests in the database 730 or other data storage system. The lease data 738 may also be utilized by customer 720 or the computing resource provider to record billing data regarding loaned or leased computing resources.

As discussed, the user can be provided a user interface for requesting a lease or loan. For example, the user may be able to access a user interface, such as the one shown in FIG. 8. In one embodiment, a customer may utilize a user interface presented by the resource lease manager module 746 of FIG. 7 to create or view the customer's instances. For example, as shown in FIG. 7, the resource lease interface module 736 or another module in the computing platform 702 may present a user interface (UI) 800 to the customer 720 in a window 802 of a web browser or other client application executing on the customer computer system 722. In one embodiment, a customer may utilize a UI presented by the resource lease interface module 736 of FIG. 7 to request a loaned resource. The UI 800 may include an instance lease window 804 listing the parameters of a customer's instances and allowing the customer to select one or more of the customer's instance for loan or lease to another entity. The instance lease window 804 may include parameters such as loan start date 806, loan start time 808, loan stop date 810, loan stop time 812, lease recipient 814, percentage of startup costs to be paid by the recipient 816, percentage of on-going costs to be paid by the recipient 818 and the like. These fields are provided to illustrate examples of possible user interface options that may be provided to a customer. As further described herein, additional fields may be provided, and some of the fields may be optional.

The UI 800 may further include a selection UI control, such as the selection UI control 820 shown in FIG. 8, that allows the customer 720 to request the described loan. These fields are provided to illustrate examples of possible user interface options that may be provided to a customer. As further described herein, additional fields may be provided, and some of the fields may be optional.

The user can also be provided a user interface for reviewing the user's loaned instances. For example, the user may be able to access a user interface, such as the one shown in FIG. 9. In one embodiment, a customer may utilize a UI presented by the resource lease interface module 736 of FIG. 7 to review the user's loaned instances. For example, as shown in FIG. 7, the resource lease interface module 736 or another module in the computing platform 702 may present the UI 900 to the customer 720 in a window 902 of a web browser or other client application executing on the customer computer system 722. The UI 900 may include a loaned instance list 904 listing the reserved instances currently on loan by the customer 720, including the type and configuration parameters of each, such as the availability zone, platform, size, tenancy and the like. The loaned instance list 904 may further include the term of each loan. The loaned instance list 904 may also include the current state of the reserved instances, such as whether the reserved instances are active or have expired.

The UI 900 may further include a selection UI control, such as the button UI control 908 shown in FIG. 9, that allows the customer 720 to select one or more reserved instances shown in the reserved instance list 904 for changing the terms of the current loan. Other methods of selecting reserved instances of instances 904 may also be implemented, including selecting a line in the reserved instance list 906 with a mouse or other input control and selecting a command UI control from a context menu presented by the resource lease interface module 736 for the selected line, for example.

These fields are provided to illustrate examples of possible user interface options that may be provided to a customer. As further described herein, additional fields may be provided, and some of the fields may be optional.

In some embodiments, an API or a programming interface sub-system may be provided for facilitating the submission of loan/lease requests. The API may be configured to receive electronic messages that encode identifiers indicative of a loan or lease request for fulfillment by the provider network. In response to receiving one of the electronic messages, the API may send second electronic messages indicative of information indicating that a loan/lease request has been received. An API may also be provided that can facilitate exchange of data with applications that may provide additional information for submitting loan/lease requests.

In additional embodiments, the resource lease interface module 736 or other modules in the computing platform 702 may provide user interfaces or APIs 732 to the customer 720 and/or customer computer system 722 that allow the customer to modify their loaned instances, check the status of the loaned instances and/or to change a setting for the loaned instances.

Figure 10:
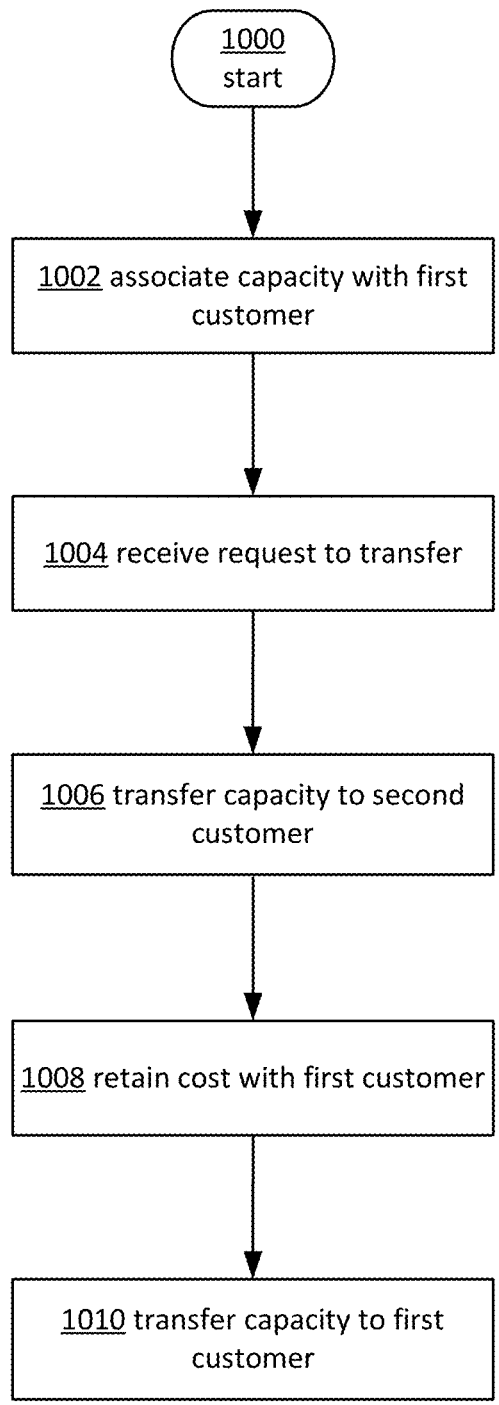
FIG. 10 is a flowchart depicting an example procedure for lending computing resources in accordance with the present disclosure.

FIG. 10 illustrates an example operational procedure for providing computing resources. In an embodiment, a mechanism for providing computing resources can be provided by services, such as resource lease manager 180 in FIG. 1. The operational procedure may be implemented in a system comprising one or more computing devices. In one embodiment, the system may comprise a multi-tenant web services platform. Referring to FIG. 10, operation 1000 begins the operational procedure. Operation 1000 may be followed by operation 1002. Operation 1002 illustrates associating computing capacity capable of providing a computing resource of the multi-tenant web services platform with a first customer of the multi-tenant web services platform. In one embodiment, the computing resource may be computing capacity to run a computing instance.

Operation 1002 may be followed by operation 1004. Operation 1004 illustrates receiving, from the first customer, a request indicative of an authorization to transfer the computing capacity to a second customer of the multi-tenant web services platform.

Operation 1004 may be followed by operation 1006. Operation 1006 illustrates, in response to the request, transferring the computing capacity to the second customer. Operation 1006 may be followed by operation 1008. Operation 1008 illustrates retaining at least a portion of a cost of the computing capacity with the first customer after transferring the computing capacity. In one embodiment, the computing capacity is transferred in accordance with at least one constraint selected by the first customer. In some embodiments, the portion of the cost comprises a startup cost for launching the computing instance. In an embodiment, the constraint comprises a time period during which the second customer is authorized to control the aspect of the computing resource.

Operation 1008 may be followed by operation 1010. Operation 1010 illustrates transferring the computing capacity back to the first customer of the multi-tenant web services platform in accordance with the at least one constraint selected by the first customer.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for providing computing resources of a multi-tenant web services platform, the method comprising:

associating computing capacity within the web services platform capable of instantiating a virtual machine instance by the multi-tenant web services platform with a first customer of the multi-tenant web services platform;

receiving, from the first customer at the multi-tenant web services platform, a request indicative of an authorization to transfer control of the virtual machine instance to a second customer of the multi-tenant web services platform;

in response to the request, transferring the use of the computing capacity within the multi-tenant web services platform to execute the virtual machine instance to the second customer, wherein a primary level of control over configuration of the virtual machine instance is kept with the first customer;

retaining at least a portion of a cost of the computing capacity with the first customer after transferring the virtual machine instance, wherein the control of the virtual machine instance is transferred in accordance with at least one constraint selected by the first customer and the at least a portion of the cost is retained according to a selection of the first customer; and transferring the control of the virtual machine instance back to the first customer of the multi-tenant web services platform in accordance with the at least one constraint selected by the first customer.

2. The method according to claim 1, wherein the at least a portion of the cost comprises a startup cost for launching the virtual machine instance.

3. The method according to claim 1, wherein the at least one constraint comprises a time period during which the virtual machine instance remains transferred to the second customer.

4. The computer-implemented method recited in claim 1 wherein the multi-tenant web services platform comprises a cloud-based computing service.

5. A system configured to allocate computing resources to customers of a multi-tenant web services platform, the system comprising:
   one or more processors; and
   at least one memory having stored therein computer instructions that, upon execution by the one or more processors, at least cause the system to:
   in response to a request from a first customer to allow a second customer to use a virtual machine instance associated with the first customer, transfer a secondary level of control of the virtual machine instance operating within the web services platform from the first customer to the second customer based on at least one constraint, wherein the at least one constraint is selectable by the first customer for transferring control of the virtual machine instance, wherein a primary level of control of a configuration of the virtual machine instance is kept with the first customer;
   associate at least a portion of a cost of the virtual machine instance with the first customer after transferring control of the virtual machine instance to the second customer; and
   terminate the control of the virtual machine instance by the second customer in accordance with the at least one constraint selected by the first customer.

6. The system according to claim 5, wherein the at least one constraint is a time limitation.

7. The system according to claim 5, wherein the at least one constraint is a limitation as to a configuration of the computing resources.

8. The system according to claim 5, further comprising computer instructions that, upon execution by one or more processors of the system, at least cause the system to provide an interface for allowing the first customer to submit the request.

9. The system of claim 8, wherein the interface is one of an API, an SDK, or a graphical user interface.

10. The system of claim 5, wherein the second customer is selected from a group of customers who have requested donated virtual machine instances.

11. The system of claim 5, wherein a computing capacity capable of running a virtual machine instance is transferred with the virtual machine instance.

12. A non-transitory computer-readable storage medium having stored thereon computer-readable instructions, the computer-readable instructions comprising instructions that upon execution on one or more computing devices, at least cause the one or more computing devices to:
   provide an interface allowing a first user of a multi-tenant web services platform to submit a request to transfer control of a virtual machine instance operating within the web services platform to a second user of the multi-tenant web services platform, wherein a primary level of control of the virtual machine instance is allocated by the multi-tenant web services platform to the first user;
   in response to the request, transferring a secondary level of control of the virtual machine instance to the second user, wherein the primary level of control is kept with the first user and at least a portion of a cost of the virtual machine instance is incurred by the first user; and
   removing the secondary level of control of the virtual machine instance by the second user in accordance with at least one constraint selectable by the first user.

13. The non-transitory computer-readable medium of claim 12, wherein the interface is an application programming interface configured to:
   receive first electronic messages that encode identifiers indicative of the request; and
   in response to receiving one of the first electronic messages, send second electronic messages indicative of information pertaining to a status of the request.

14. The non-transitory computer-readable medium of claim 12, wherein the at least one constraint includes a limited time period during which the secondary level of control is transferred to the second user.

15. The non-transitory computer-readable medium of claim 14, further comprising instructions that upon execution on one or more computing devices, at least cause the one or more computing devices to bill at least a second portion of cost associated with the virtual machine instance to the second user.

16. The non-transitory computer-readable medium of claim 12, further comprising computer-readable instructions that upon execution on the one or more computing devices, at least cause the one or more computing devices to bill at least a first portion of a cost associated with the virtual machine instance to the first user.

17. The non-transitory computer-readable medium of claim 12, wherein the at least one constraint comprises restrictions regarding usage of features that incur billable costs from the multi-tenant web services platform.

18. The non-transitory computer-readable medium of claim 12, further comprising instructions that upon execution on one or more computing devices, at least cause the one or more computing devices to generate a second user interface allowing the second user to receive an indication that access to the virtual machine instance has been allowed.

19. The non-transitory computer-readable medium of claim 12, further comprising instructions that upon execution on one or more computing devices, at least cause the one or more computing devices to allow the second user to relinquish the secondary level of control.

20. The non-transitory computer-readable medium of claim 12, further comprising instructions that upon execution on one or more computing devices, at least cause the one or more computing devices to generate a third user interface allowing the first user to obtain status of virtual machine instances that are associated with the first user for which secondary control has been transferred to other users.

* * * * *